( 12 ) United States Patent
Bito

(10) Patent No.: US 8,242,737 B2
(45) Date of Patent: Aug. 14, 2012

(54) MOTOR-DRIVEN VEHICLE

(75) Inventor: Seiji Bito, Shizuoka-ken (JP)

(73) Assignee: Suzuki Motor Corporation, Shizuoka-ken (JP)

( * ) Notice: Subject to any disclaimer, the term of this patent is extended or adjusted under 35 U.S.C. 154(b) by 270 days.

(21) Appl. No.: 12/847,866

(22) Filed: Jul. 30, 2010

(65) Prior Publication Data
US 2011/0031937 A1 Feb. 10, 2011

(30) Foreign Application Priority Data

Aug. 4, 2009 (JP) ................. 2009-181452

(51) Int. Cl.
*H02J 7/14* (2006.01)

(52) U.S. Cl. .................. 320/104; 320/134; 903/947

(58) Field of Classification Search .............. 320/104, 320/134, 136, 150, 153; 903/947
See application file for complete search history.

(56) References Cited

U.S. PATENT DOCUMENTS 7,479,761 B2 * 1/2009 Okumura ................. 320/132
7,520,353 B2 * 4/2009 Severinsky et al. ........ 180/65.28
* cited by examiner

*Primary Examiner* — Edward Tso
*Assistant Examiner* — Aaron Piggush
(74) *Attorney, Agent, or Firm* — Marsh Fischmann & Breyfogle LLP

(57) ABSTRACT

In a motor-driven vehicle using power stored in a secondary battery as a source of motive power in which part of vehicle braking is achieved by regenerative braking by generating electrical energy absorbed by charging the secondary battery, the state of charge of the secondary battery is adjusted during charging so that, when charging is completed, the state of charge of the battery will be such that it is still capable of receiving energy generated during regenerative braking. During charging, after the battery has been charged to a target charge level, and battery temperature has subsequently changed, a state where the battery is still capable of receiving energy generated during regenerative braking can be achieved by slightly discharging the battery depending on the temperature of the battery. Such slight discharge of the battery can be obtained by powering an electric heater (22) in an engine cooling water circuit or operating a generator (7) as a motor for motoring the vehicle engine (8).

6 Claims, 3 Drawing Sheets

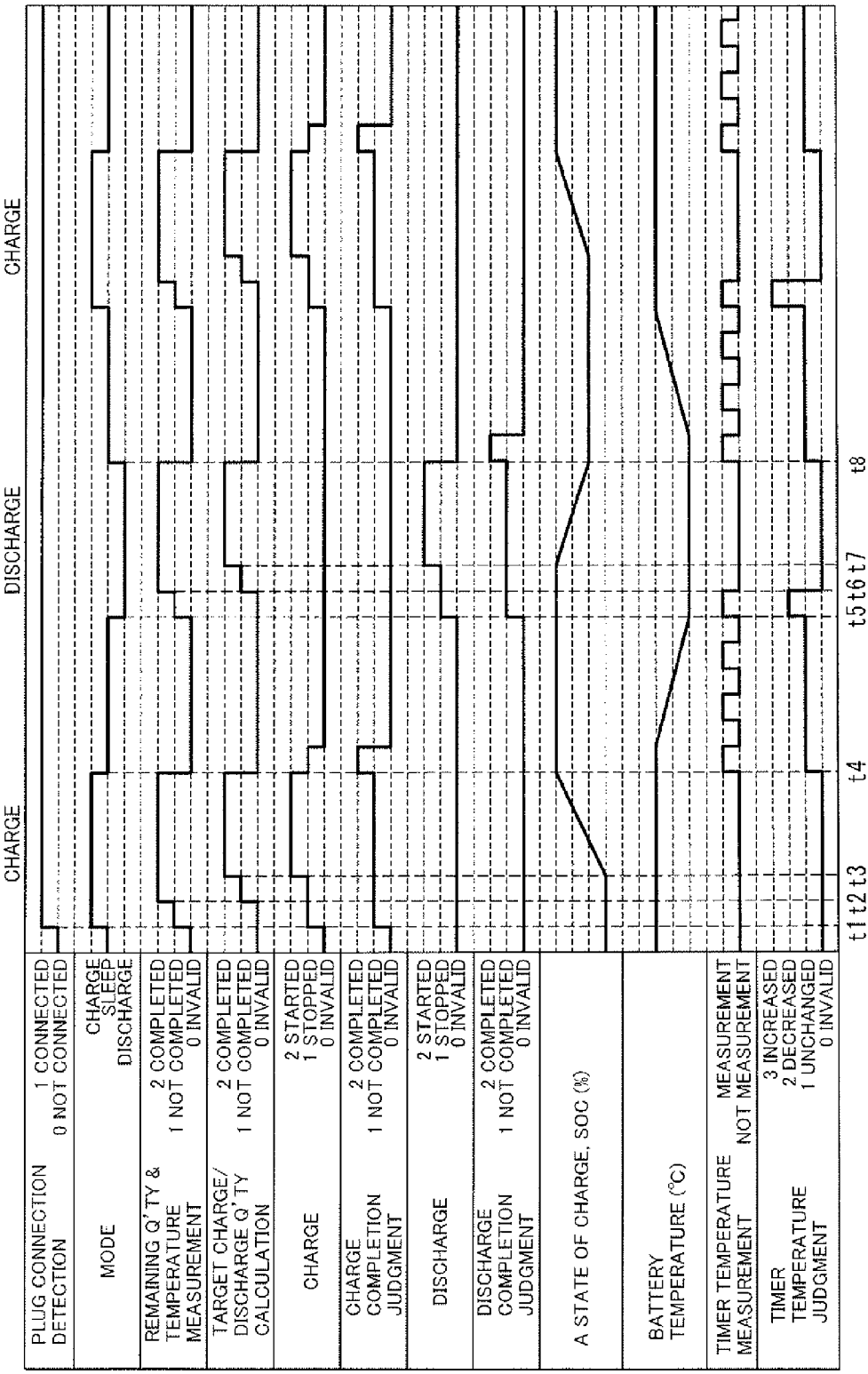

MOTOR-DRIVEN VEHICLE

FIELD OF THE INVENTION

The present invention relates to a motor-driven vehicle and particularly to a motor-driven electric vehicle utilizing power stored in a secondary battery as a source of motive power and which is capable of exhibiting braking force to the full using regenerative braking.

BACKGROUND OF THE INVENTION

A motor-driven vehicle such as an electric vehicle (EV), a plug-in hybrid vehicle (PHEV) and the like is propelled by a motor utilizing power stored in a secondary battery as a source of motive power for driving the wheels. In this motor-driven vehicle, braking force is generated by executing regenerative braking which is attained by operating a motor as a generator at the time of speed reduction with recovery of kinetic energy in the form of electrical energy. As seen, in the electric vehicle, an electric braking system is used for providing part of the braking force.

Among conventional motor-driven vehicles, there is a vehicle of the type having an engine for travel and a motor and a secondary battery, wherein a canister for absorbing fuel evaporated from the engine is equipped with a heater and regenerative power is fed to the heater to purge the evaporated fuel for supply to the intake system of the engine when regenerative power cannot be used for charging the secondary battery because the secondary battery is in a fully charged condition. This is the situation exemplified in Japanese published patent application 1999-343890.

Japanese published patent application 2008-195315 discloses a motor-driven vehicle of the type having a secondary power source which is charged using at least either power from the engine or from an external power source, wherein the battery is kept charged using the power from the engine when the temperature of the charged battery is equal to or less than a predetermined value after charging of the battery by the external power source is completed.

Now, when a secondary battery is being charged, it would appear that it is sufficient to periodically measure the state of charge of the battery during charging, and then finish charging when the battery is incapable of receiving any further charge. However, this is not sufficient to meet the requirements of regenerative braking which require that the battery be in a suitable state of charge to allow it to receive a further charge, although small, during regenerative braking. Since braking capability using an electric regenerative braking system depends on the state of the secondary battery (state of charge and temperature), a problem arises making it necessary to employ an expensive and complicated system of the cooperative regenerative braking system type. Especially, when the voltage of the secondary battery has been increased to near the level corresponding to a chargeable upper limit, charging capability of the secondary battery using regenerative power becomes diminished.

For this reason, another problem arises in that, depending on the state of charge of the secondary battery, braking force using regenerative braking which is responsible for a part of the braking of the electric vehicle cannot always be deployed to its best advantage.

SUMMARY OF THE INVENTION

It is, therefore, an aim of the invention to provide a motor-driven vehicle capable of guaranteeing, after charging, that braking force using regenerative braking that plays a part in braking can be fully deployed, by ensuring that the state of charge of the battery is such that the battery may still be charged by regenerative power during which regenerative power is used to charge said battery, by suitably adjusting the state of charge of the secondary battery which is variable depending on temperature.

In order to overcome the above problems, in a motor-driven vehicle utilizing power stored in a secondary battery as a source of motive power in which part of vehicle braking is achieved by regenerative braking by generating electrical energy absorbed by charging said secondary the battery, wherein a charging capability of the secondary battery by regenerative power can be guaranteed, the invention provides a method of regulating a state of charge of the secondary battery while the secondary battery is being charged by an external power source, comprising the steps of:

entering a charge mode, and determining a remaining quantity of charge in the secondary battery based at least on a temperature of the battery, calculating a target charge quantity, charging the battery until a state of charge becomes equal to the target charge quantity, when state of charge becomes equal to the target charge quantity, replacing the charge mode by a sleep mode and measuring at least a temperature of the battery periodically as determined by a timer, judging on each occasion whether the temperature has decreased or increased, if the result of judgment corresponds to an increase, returning to the step of target charge quantity calculation, if the judgment finds that the temperature has decreased, shifting the mode to a discharge mode, and in the discharge mode, determining a remaining charge quantity as a function of at least the temperature of the battery, and when the remaining charge quantity in the battery is such that a charge quantity corresponding to an amount of regenerative energy for braking of the motor-driven vehicle cannot be received by the battery, calculating a target discharge quantity, and performing discharging of the battery until the target discharge quantity is reached, and then returning to periodically measuring at least a temperature of the battery.

Discharging of the battery can be performed by feeding power to an electric water heater for heating cooling water of an engine of the motor-driven vehicle or by feeding power to a generator, and using the generator to motor an engine of the motor-driven vehicle.

The invention also provides a motor-driven vehicle utilizing power stored in a secondary battery as a source of motive power in which part of vehicle braking is achieved by regenerative braking by generating electrical energy absorbed by charging the secondary battery, wherein a charging capability of the secondary battery by regenerative power after charging is guaranteed, the motor-driven vehicle comprising:

charge management means enabling the battery to be charged using an external power source a motor, a power control unit, a battery state detecting unit capable of detecting at least a temperature of the secondary battery and means for determining a quantity of charge in the secondary battery based at least on the temperature of the battery, means for calculating a target charge quantity on the basis of the determination of quantity of charge in the secondary battery, means for charging the battery under the control of the charge management means until a state of charge becomes equal to the target charge quantity, means for periodically judging, based on the output of the battery state detecting unit whether battery temperature has decreased or increased, means for, when the temperature has decreased, shifting a charge mode to a discharge mode, and in the discharge mode, for calculating a target discharge quantity, and means for, when a quantity of charge in the battery is such that it does not allow kinetic energy to be recovered as electrical energy to charge the battery and allow regenerative braking to be deployed to the full, performing discharging of the battery until the target discharge quantity is reached.

Since in the electric vehicle of the present invention, state of charge of the secondary battery which is changeable depending on temperature can be adjusted, it is possible to adjust the state of charge so that charging capability by regenerative power of the secondary battery can be guaranteed, and braking force by regenerative braking that plays a part in the braking of the electric vehicle can be deployed to the maximum.

BRIEF DESCRIPTION OF THE DRAWINGS

FIG. 4 is a time chart for battery charge and discharge in the motor-driven vehicle.

DETAILED DESCRIPTION OF A PREFERRED EMBODIMENT

A motor-driven vehicle according to the present invention is capable of fully exhibiting braking force by regenerative braking by adjusting a state of charge of a secondary battery based on temperature. One embodiment of the present invention will be described hereinafter with reference to the drawings.

Figure 1:
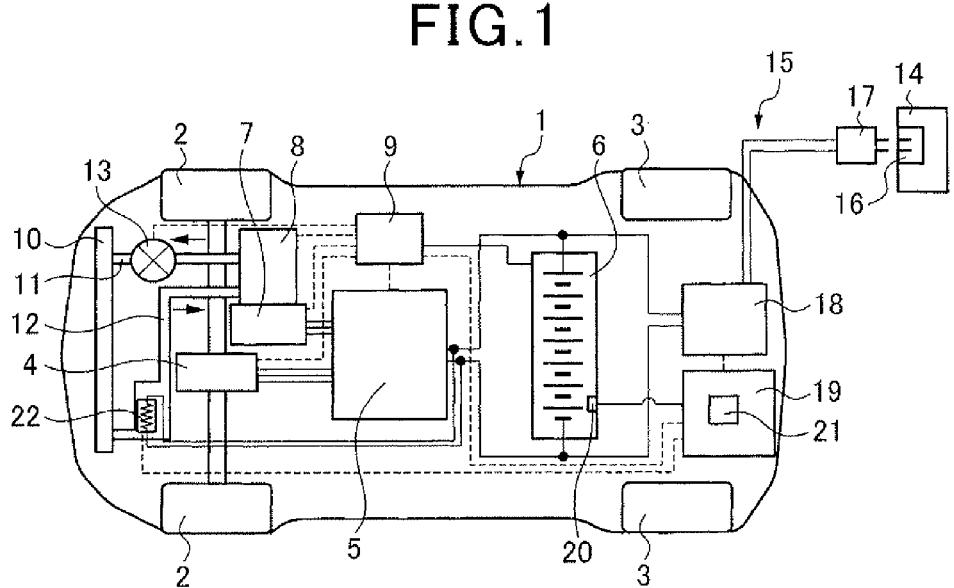
FIG. 1 is a system diagram of the motor-driven vehicle.

FIGS. 1 through 4 show one embodiment of the present invention. In FIG. 1, reference numeral 1 denotes a motor-driven vehicle; 2, front wheels and 3, rear wheels, respectively. The motor-driven vehicle 1 comprises a motor 4 which can function as a generator, an inverter 5, a battery 6 consisting of a secondary battery, a generator 7 for charging the battery 6, an engine 8 for driving the generator 7, and a power control unit 9 for controlling them. The power control unit 9, as shown in FIG. 4, controls charge and discharge of the battery 6 in accordance with a charge mode, a sleep mode and a discharge mode.

The motor-driven vehicle 1 runs by driving the motor 4 and rotating the front wheels 2 via the power control unit 9, employing power stored in the battery 6 as a source of motive power. In the motor-driven vehicle 1, the power control unit 9 performs control in such a way that the motor 4 is driven by rotation of the front wheels 2 when speed is being reduced, and a braking force is generated by executing regenerative braking by operating the motor 4 as a generator, the kinetic energy being recovered as electrical energy in order to charge the battery 6.

Moreover, in the motor-driven vehicle 1, the power control unit 9 is adapted to perform control such that the generator 7 is driven by the engine 8 so as to charge the battery 6. Also, in the motor-driven vehicle 1, the power control unit 9 performs control such that the generator 7 can be operated as a motor by providing power from the battery 6 so as to cause the engine 8 to revolve (so-called motoring of the engine). The engine 8 for driving generator 7—which latter can also function as a motor for driving the engine during motoring—comprises a radiator 10 for cooling the engine cooling water. The engine 8 and the radiator 10 communicate with each other through a cooling water outlet pipe 11 and a cooling water inlet pipe 12. The cooling water outlet pipe 11 is provided with a water pump 13 for circulating the engine cooling water.

The motor-driven vehicle 1 comprises charge management means 15 enabling the battery 6 to be charged using an external power source 14 separately from the generator 7 which is driven by the engine 8. The charge management means 15 comprise a charging terminal 17 connectable to an external terminal 16 of the external power source 14, a charging circuit unit 18 for feeding power input from the charging terminal 17 to the battery 6 and charging the battery 6, a charge control unit 19 for controlling the charging circuit unit 18, and a battery state detecting unit 20 capable of detecting the temperature/voltage/current of the battery 6. When it is detected that the charging terminal 17 is connected to the output terminal 16 of the external power source 14, a specific charge mode is invoked at charge control unit 19. The charge control unit 19 exchanges information with the power control unit 9 through communication therewith and operates in association with the power control unit 9.

Charge control unit 19 comprises target charge and discharge quantity calculating means 21. The target charge and discharge quantity calculating means 21 calculates a target charge and discharge quantity so that this becomes a state of charge (SOC) set based on at least temperature of the battery 6 detected by the battery state detecting unit 20 (see FIG. 3 which shows a relation between temperature and SOC). Charge control unit 19 controls a charging circuit unit 18, based on a target charge quantity calculated by the target charge and discharge quantity calculating means 21. It should be noted that where the power source control unit 9 includes battery state detecting unit 20, the charge control unit 19 can obtain a state of the battery 6 by exchanging information and communication.

The motor-driven vehicle 1 comprises an electric heater 22 for heating engine cooling water of the engine 8. The electric heater 22 consists of, for example, a PTC heater and is disposed at the cooling water inlet pipe 12 and is operated by power from the battery 6 to heat the engine cooling water which is introduced into the engine 8.

The target charge and discharge quantity calculating means 21 are responsible for calculating a target discharge quantity, and in case discharging of the battery 6 is required, power can be fed to the electric heater 22 from the battery 6 to operate the electric heater 22, as a way of achieving battery discharge. Similarly, where the target charge and discharge quantity calculating means 21 determine some discharging of the battery 6 is required, power can also be fed to the generator 7 from the battery 6 to motor the engine 8 by the generator 7.

The expression "in case discharging of the battery 6 is required" refers to a state of charge of battery 6 such that it is unable to receive the regenerative power necessary for providing the necessary braking force of motor-driven vehicle 1.

Operation of the invention will now be described hereinafter.

Figure 2:
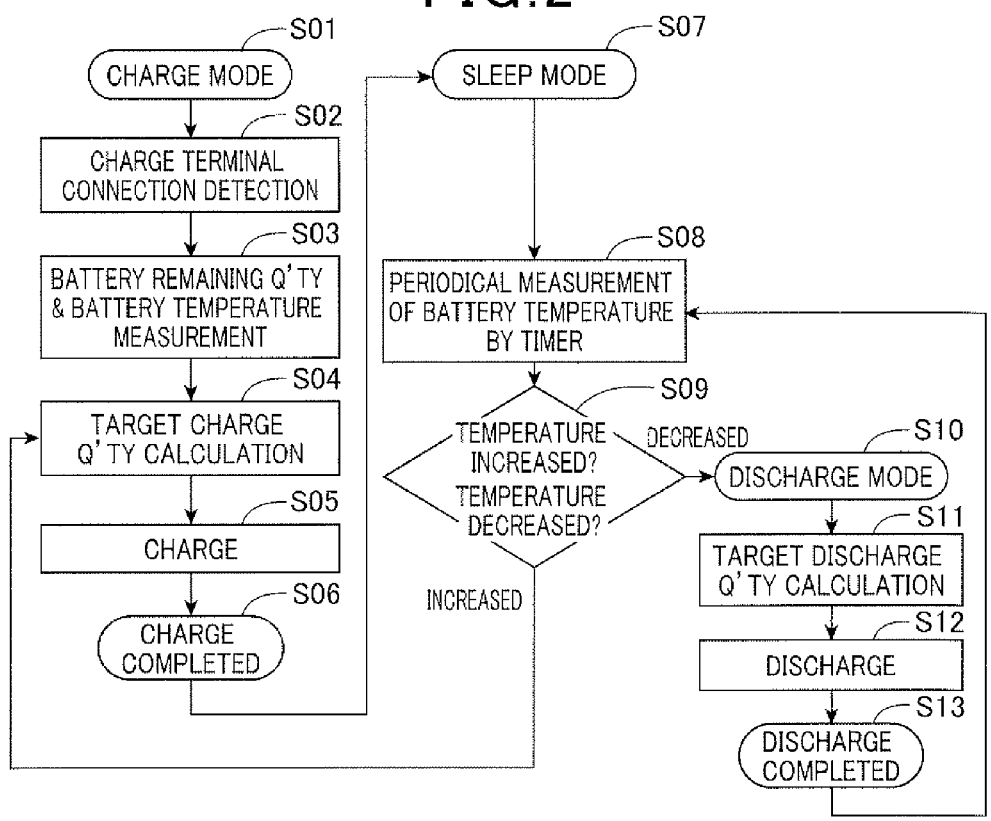
FIG. 2 is a flowchart showing charging and discharge in the motor-driven vehicle.
Figure 3:
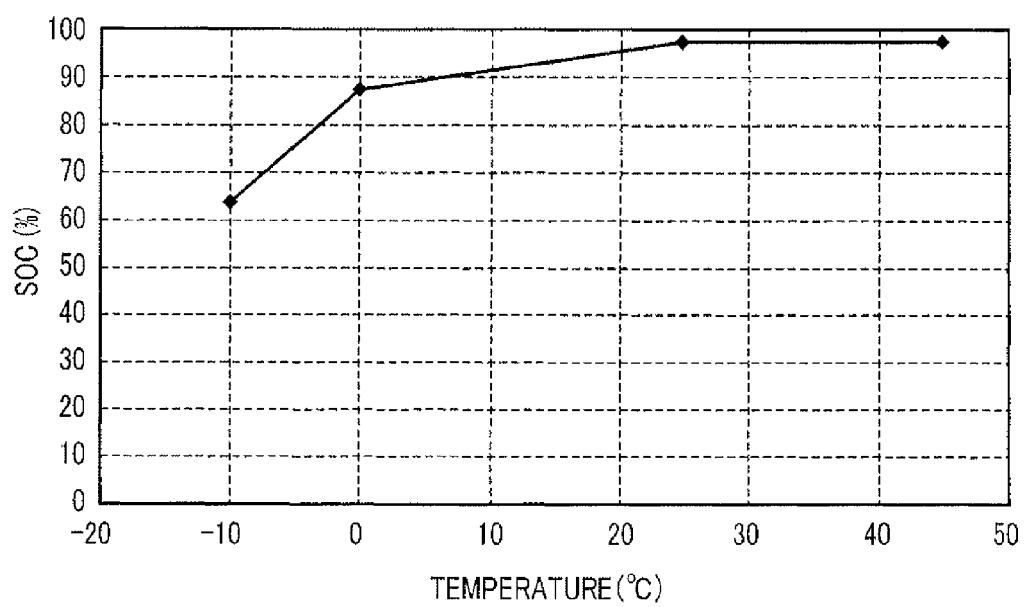
FIG. 3 shows a map used for setting a target charging quantity based on temperature.

With reference to FIG. 2, in the motor-driven vehicle 1, when entering a charge mode (step S01) it is first determined (step S02) whether or not a charge terminal 17 is connected to the output terminal 16 of the external power source 14 (t1 of FIG. 4). Next, at step S03, the remaining quantity of charge/ temperature of the battery 5 is measured (t2 of FIG. 4) and a target charge quantity is calculated at step S04 (t3 of FIG. 4) and charging is performed (at step S05) so that the battery 6 gets charged until the state of charge becomes equal to the target charge quantity (t3 of FIG. 4) (step S06).

When the state of charge of the battery 6 has been increased by charging toward the target charge quantity (following t3 of FIG. 4) and when charging is completed (t4 of FIG. 4) (step S06), the mode is shifted to a sleep mode (t4 of FIG. 4) (step S07) and the temperature of the battery 6 is measured periodically as determined by a timer (following t4 of FIG. 4) (step S08), judging on each occasion whether the temperature has decreased or increased (t5 of FIG. 4) (step S09).

If the result of the judgment (step S09) corresponds to an increase, the process will return to a target charge quantity calculation (step S04). If the judgment (step S09) finds that the temperature has decreased, the mode is shifted to a discharge mode (t5 of FIG. 4) (step S10). In the discharge mode (step S10), the remaining charge quantity/temperature of the battery 6 are measured (t6 of FIG. 4), the target discharge is calculated (t7 of FIG. 4) (step S11) and discharging of the battery 6 is performed in order to obtain the target discharge quantity (t7 of FIG. 4) (step S12).

When the state of charge of the battery 6 is such that the regenerative power required to provide a corresponding braking force of the motor-driven vehicle 1 cannot be received by the battery, the state of charge of the battery 6 is decreased, by discharging, in a direction of a target discharge quantity (starting at time t7 of FIG. 4), and when the discharging is completed (t8 of FIG. 4) (step S13), the mode is shifted to the sleep mode (t8 of FIG. 4) and the procedure returns to the temperature measurement of the battery 6 (t8 of FIG. 4) (step S08).

Discharging of the battery 6 (step S12) can be achieved by feeding power to the electric heater 22 from the battery 6 and operating the electric heater 22 to discharge the battery 6. Alternatively, power is fed from the battery 6 to the generator 7 and the engine 8 is motored by the generator 7 to discharge the battery 6.

As discussed, in the motor-driven vehicle 1, since the state of charge of the battery 6, which is changeable as a function of temperature, can be adjusted, the state of charge can be adjusted so that charging capability using regenerative power of battery 6 is increased, and therefore, braking force resulting from generation of regenerative power and which is responsible for a part of the braking of the motor-driven vehicle 1, can fully be exhibited.

Moreover, in the motor-driven vehicle 1, since the battery 6 can be used as an operating power source for the electric heater 22 for heating the engine cooling water of the engine 8, the battery 6 can easily be discharged when discharging of the battery 6 is required to ensure regenerative braking force can be deployed to the full after charging is completed.

Since discharging of the battery 6 by operating the electric heater 22 heats the engine cooling water, a useful functional effect can be achieved through a lowering of the level of harmful substances the next time the engine 8 is started with enhancement of passenger comfort through heating of the passenger compartment before the driver enters the motor-driven vehicle 1.

Moreover, since the motor-driven vehicle 1 uses motoring of the engine 8 by the generator 7 as an electric load for discharging the battery 6, engine friction can be decreased in advance thereby reducing the level of emission of harmful substances the next time the engine is started.

According to the present invention, state of charge of the secondary battery can be regulated so that the ability to charge the secondary battery using regenerative power is guaranteed and regenerative braking force, that is responsible for part of the braking of the motor-driven vehicle, can be exhibited to the full. The present invention is applicable not only to a so-called series hybrid motor-driven vehicle equipped with an engine for generating electricity but also to a hybrid motor-driven vehicle equipped with an engine for driving the wheels and a motor.

LIST OF REFERENCE NUMERALS

1 motor-driven vehicle
4 motor
5 inverter
6 battery
7 generator
8 engine
9 electric control unit
10 radiator
14 external power source
15 charge management means
16 output terminal
17 charge terminal
18 charging circuit unit
19 charge control unit
20 battery state detecting unit
21 target charge and discharge quantity calculating means
22 electric heater

What is claimed is:

1. In a motor-driven vehicle utilizing power stored in a secondary battery as a source of motive power in which part of vehicle braking is achieved by regenerative braking by generating electrical energy absorbed by charging said secondary the battery, wherein a charging capability of the secondary battery by regenerative power can be guaranteed, a method of regulating a state of charge of the secondary battery while the secondary battery is being charged by an external power source, comprising the steps of:

entering a charge mode, and determining a remaining quantity of charge in said secondary battery based at least on a temperature of said battery, calculating a target charge quantity, charging said battery until a state of charge becomes equal to the target charge quantity, when state of charge becomes equal to the target charge quantity, replacing said charge mode by a sleep mode and measuring at least a temperature of said battery periodically as determined by a timer, judging on each occasion whether the temperature has decreased or increased, if the result of judgment corresponds to an increase, returning to the step of target charge quantity calculation, if the judgment finds that the temperature has decreased, shifting said mode to a discharge mode, in said discharge mode, determining a remaining charge quantity as a function of at least the temperature of said battery, and when said remaining charge quantity in said battery is such that a charge quantity corresponding to an amount of regenerative energy for braking of said motor-driven vehicle cannot be received by said battery, calculating a target discharge quantity, and performing discharging of said battery until said target discharge quantity is reached, and then returning to periodically measuring at least a temperature of said battery.

2. The method according to claim 1, in which discharging of said battery is performed by feeding power to an electric water heater for heating cooling water of an engine of said motor-driven vehicle.

3. The method according to claim 1, in which discharging of said battery is performed by feeding power to a generator, and using said generator to motor an engine of said motor-driven vehicle.

4. A motor-driven vehicle utilizing power stored in a secondary battery as a source of motive power in which part of vehicle braking is achieved by regenerative braking by generating electrical energy absorbed by charging said secondary battery, wherein a charging capability of the secondary battery by regenerative power after charging is guaranteed, said motor-driven vehicle comprising:

charge management means enabling said battery to be charged using an external power source,
   a motor,
   a power control unit,
   a battery state detecting unit capable of detecting at least a temperature of said secondary battery and means for determining a quantity of charge in said secondary battery based at least on said temperature of said battery,
   means for calculating a target charge quantity on the basis of said determination of quantity of charge in said secondary battery,
   means for charging said battery under the control of said charge management means until a state of charge becomes equal to the target charge quantity,
   means for periodically judging, based on the output of said battery state detecting unit whether battery temperature has decreased or increased,
   means for, when said temperature has decreased, shifting a charge mode to a discharge mode, and in said discharge mode, for calculating a target discharge quantity,
   and means for, when a quantity of charge in said battery is such that it does not allow kinetic energy to be recovered as electrical energy to charge said battery and allow regenerative braking to be deployed to the full, performing discharging of said battery until said target discharge quantity is reached.

5. The vehicle of claim 4, wherein said means for performing discharge of said battery comprise an electric heater disposed in an engine cooling water circuit and means for feeding electrical energy to said electric heater in order to heat the water in said cooling water circuit and consume electrical energy stored in said secondary battery.

6. The vehicle of claim 4, comprising an engine wherein said means for performing discharge of said battery comprise a generator which is operated as a motor for motoring said engine thereby consuming electrical energy stored in said secondary battery.

* * * * *